Nov. 13, 1951 C. F. FRAGOLA 2,574,471
GYROMAGNETIC COMPASS
Filed Aug. 23, 1945 3 Sheets-Sheet 2

INVENTOR
Caesar F. Fragola
BY
Herbert H. Thompson
his ATTORNEY.

Nov. 13, 1951 — C. F. FRAGOLA — 2,574,471
GYROMAGNETIC COMPASS
Filed Aug. 23, 1945 — 3 Sheets-Sheet 3

INVENTOR
Caesar F. Fragola
BY Herbert H. Thompson
his ATTORNEY.

Patented Nov. 13, 1951

2,574,471

UNITED STATES PATENT OFFICE 2,574,471

GYROMAGNETIC COMPASS

Caesar F. Fragola, East Hempstead, N. Y., assignor to The Sperry Corporation, a corporation of Delaware Application August 23, 1945, Serial No. 612,189
In Canada August 10, 1942

6 Claims. (Cl. 33—222)

This invention relates to gyro-magnetic compasses in which a gyroscope, preferably of the directional type, constitutes the primary meridian indicator, but a meridian sense is imparted thereto and wandering is prevented by weakly coercing it by a torque about its horizontal axis controlled from some form of magnetic compass, such as an ordinary magnetic compass having a suitable pick-off device for comparing its position with that of the directional gyroscope, or a flux valve compass, the output of which replaces other pick-offs. The gyroscope in such a system is frequently referred to as a slave gyroscope, being under the supervision of a magnetic compass. Such a combination has proved very useful, especially in aircraft, since the relative insensitivity of the gyroscope to transient forces is utilized as a means for maintaining the true heading during the relatively short period that the magnetic compass is disturbed due to turns and the like.

The present invention is a continuation-in-part of my prior application, joint with O. E. Esval, R. S. Curry and L. F. Beach, now Patent 2,383,461 for Flux Valve Compass System, dated August 28, 1945, the specific invention claimed herein being applicant's sole invention.

In all forms of the gyro-magnetic compass, the torque exerted on the gyroscope causing it to align itself with the magnetic meridian is made quite low, so that the rate of precession is so slow that the gyroscope is not materially disturbed during temporary deviation of the magnetic compass. In practice, a precession rate of about four degrees per minute is utilized. At such a low rate, which is slower than the movements of the minute hand of a clock, it is impossible for the aviator to determine at a glance whether the card on the gyroscope or the repeater compasses actuated therefrom may be relied upon to give the true magnetic compass reading. This slow precession rate also materially delays starting up the gyro-magnetic system since if, when thrown in, the gyroscope is at a fair displacement from the meridian, a long period may have to elapse before it may be relied upon to show the meridian, thus delaying the take-off.

By my invention, I propose to overcome both of the above difficulties by providing a visual indicating means independent of the compass card, showing when and in which direction the synchronizing torque means is acting on the gyroscope. If such auxiliary indicator shows the gyroscope to be off to the left, say, the aviator may quickly grasp the setting knob and turn it in the proper direction to restore it near the meridian, which will be shown when the torque indicator no longer provides an indication.

While I have shown in the present application only the flux valve form of compass, it will be understood that my invention may be equally applied to a gyro-magnetic compass utilizing a magnetic compass in the system, such as shown in the patent to L. F. Carter et al., No. 2,363,500, dated November 28, 1944 for Gyromagnetic Compass Systems.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Referring to the drawings,

Fig. 4 shows a modification of the arrangement of Fig. 3, relating particularly to the portions to the right of the line A—A in Fig. 3, and also showing the use of a solenoid-operated signal instead of the signal lamps of Figs. 1 and 3.

Figure 1:
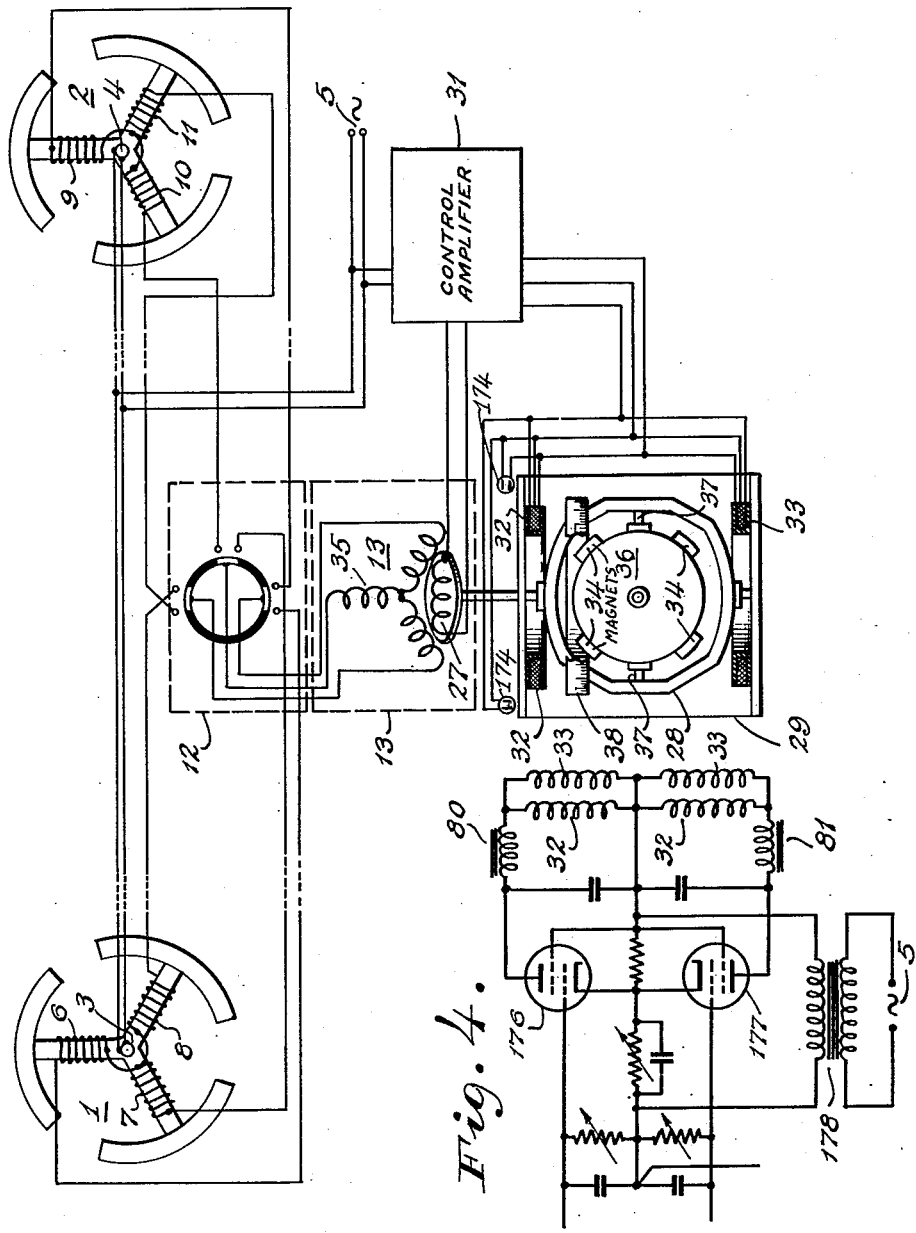
Fig. 1 is a schematic representation and wiring diagram of a gyro-magnetic system with my invention shown applied thereto.

While in Fig. 1, I have shown two flux valves 1 and 2 for the purposes more particularly set forth in the aforesaid parent application, it will be understood that only one such valve may be used in the system, as exemplified in the prior patent to O. E. Esval and C. A. Frische, No. 2,357,319, dated September 5, 1944 for Flux Valve Magnetic Compasses. The two flux valves are shown as having their primary energizing coils 3 and 4 energized in parallel from a suitable source 5 of alternating current. The outputs from these flux valves obtained from triple secondary windings 6, 7 and 8, and 9, 10 and 11 are connected in three-phase Y or poly-circuit fashion, as I have shown, and thence to a rotary selector switch 12 adapted to transmit the output from either or both flux valves to a signal transformer 13, preferably of the selsyn signal generator type.

As understood in the art, the output of such a three-legged flux valve is similar to that of a selsyn transmitter and hence the output of said secondary windings may be connected to similar poly-circuit windings 35 of a selsyn signal generator 13, so that a signal is given by the single-phase rotor winding 27 of the latter upon disagreement in the relative position of the respective windings of generator 13 as compared to the position of the flux valve in the earth's magnetic field. One of the windings 27 or 35 is accordingly positioned by the vertical ring 28 of the directional gyroscope 29. The output of the rotor 27 is shown as fed to a phase sensitive control amplifier 31, shown more particularly in Fig. 3. The amplifier 31 may be energized from the same source 5 as are the primary windings of the flux valves 1 and 2, preferably, however, with a frequency doubler interposed.

The output of the amplifier 31 controls the precession controlling center tapped coils 32 and 33, the respective halves of which exert a torque in either direction about the horizontal axis of the directional gyroscope. While this torquer may assume many forms, I have shown the coils 32 and 33 as fixed horizontal coils which cooperate with permanent magnets 34 fixed to the rotor bearing casing 36 pivoted in vertical ring 28 on horizontal pivots 37. Each coil is of the double-wound or center-tapped variety the respective halves of the two coils being shown as connected in parallel. When one pair of each half coil is excited it precesses the gyrosocpe 29 in azimuth in one direction until the position of the winding 27 corresponds to the direction of the earth's field and when the other pair of half coils is excited, opposite precession in azimuth takes place. A compass card 38, therefore, mounted on or turned from the directional gyroscope will indicate the true magnetic meridian. Furthermore, as explained in my aforesaid prior patent application, turning of the aircraft in azimuth, carrying with it the flux valve, will not bring the torque-applying devices into operation, because the winding 27 will be held stationary in azimuth by the gyroscope just as the earth's magnetic field is stationary and not changed by the ship's turning. If, however, deviation or wandering of the gyroscope should occur, the electrical relationship of windings 35 and 27 of the signal transformer will vary with respect to the relationship of the flux valve windings in the earth's field, thereby producing a voltage which will cause the gyroscope to precess in the deviation-erasing direction.

Figure 2:
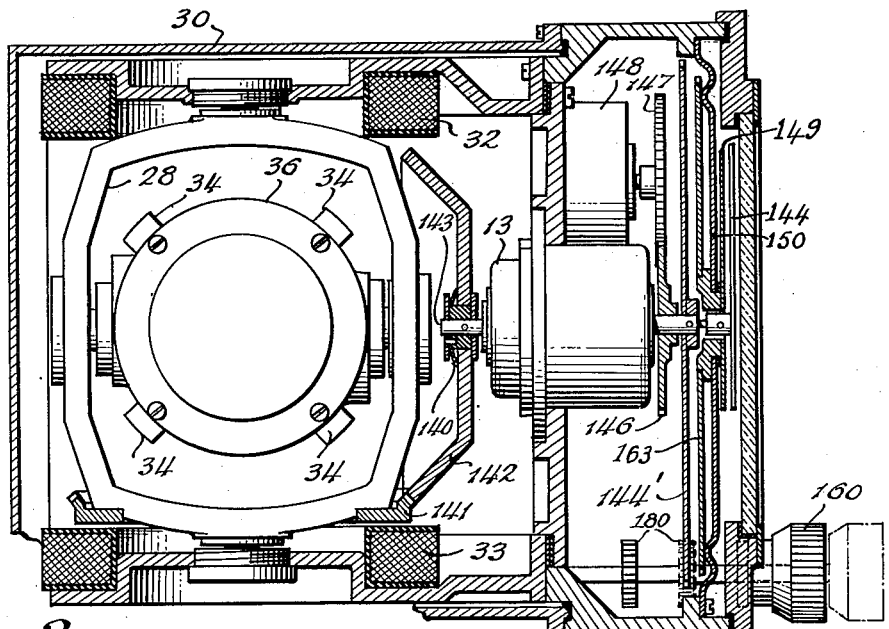
Fig. 2 is a vertical section through a directional gyroscope of my invention, showing details not appearing in Fig. 1.
Figure 5:
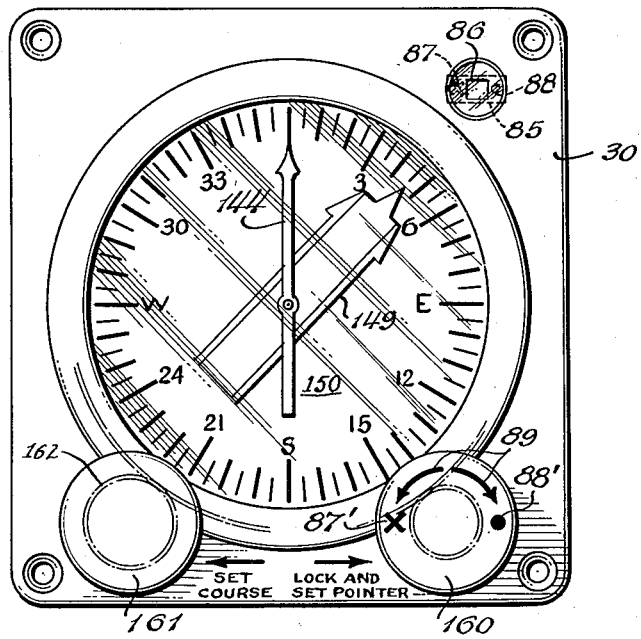
Fig. 5 is a face view of the directional gyroscope, showing a modified form of signal indicator as compared to Figs. 1 and 3.

The preferred construction of directional gyroscope is shown in Figs. 2 and 5. In these figures the rotor casing or case 36, magnets 34, vertical ring 28 and precession coils 32 and 33 are substantially as shown in Fig. 1. The compass card 150 in Figs. 2 and 5, however, is of the vertical flat type that is suitably fixed in the housing of the directional gyro 29. The card 150 is read in connection with a movable element or pointer 144. In order to rotate the pointer 144 with the gyroscope, I have shown attached to the vertical ring 28 of the gyroscope a ring gear 141 which meshes with a vertical gear 142 and thereby turns a shaft 143 through a slip-friction clutch 140. Mounted on shaft 143 is the rotor of the selsyn signal transformer or generator 13, the casing of which is fastened to the wall of the housing or case 30. Shaft 143 extends through signal transformer 13 and carries the pointer 144 and also gears 144' and 146, the latter engaging a gear 147 to thereby rotate the rotor of a selsyn or other transmitter 148, which may actuate one or more repeater compasses (not shown).

Associated with the pointer 144 is a course indicator 149 that is set in connection with the stationary compass card 150. The setting of the pointer 144 is accomplished by means of the lock-and-set pointer knob 160, which carries on the shaft thereof a gear 180 normally out of mesh with gear 144'. When said knob 160 is pulled out, however, said gears 180 and 144' are brought into mesh and the pointer may be reset without disturbing the gyroscope due to the slip-friction connection 140 and gyro locking device (not shown). The course setting indicator 149 is set from a separate knob 161, the same having a gear 162 on its shaft that meshes with gear 163, Fig. 5, when properly adjusted to accomplish the result.

Figure 3:
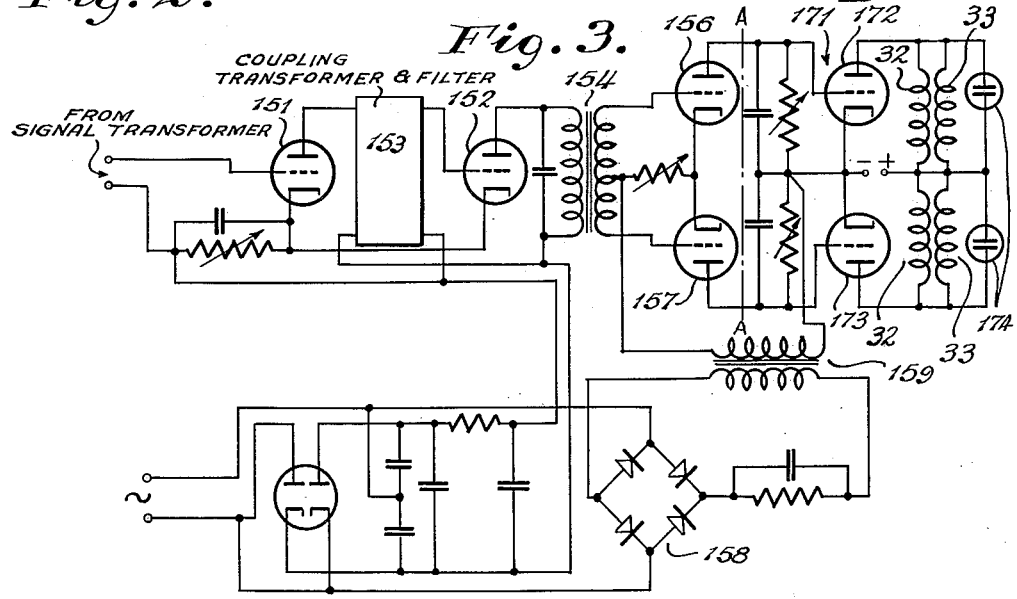
Fig. 3 is a schematic wiring diagram of one type of control amplifier suitable for use in the system of Fig. 1.

Fig. 3 shows a suitable type of phase-sensitive amplifier represented generally by 31 in Fig. 1. The input to the amplifier derived from the output of signal transformer 13 is twice the frequency of the source 5. This input is fed to a two-stage amplifier comprising tubes 151 and 152 coupled by a combined coupling transformer and band pass filter 153. The output of tube 152 is coupled by way of tuned coupling transformer 154 to a phase-sensitive rectifier shown as two push-pull connected tubes 156 and 157, the plates of which are energized through transformer 159 connected across a diagonal of the rectifier bridge 158 from which is derived the double frequency ripple. The output of the tubes 156 and 157 is preferably amplified in an amplifier 171, shown as comprising push-pull connected tubes 172 and 173. The center-tapped precessing coils 32 and 33 are shown as forming the load impedances of this amplifier, and I prefer to connect my left-right torque indicators, which are shown in the form of neon lamps 174, across the sections of these coils. These indicators may be adjusted to glow when current of appreciable magnitude passes through the respective sections of the coils, such as a current corresponding to one-degree deviation of the gyroscope from the magnetic meridian.

These indicators are especially useful when first starting up the gyroscope, as at that time the gyroscope may be in any position and the precession rate is too low to cause the gyro to synchronize itself in a reasonable time. These indicators will then show that resetting of the gyro is necessary and in which direction the gyroscope is off, by having one indicator on one side of the gyroscope and the other on the opposite side, as shown in Fig. 1, or by having the neon lamps red and green for instance. Therefore, in starting up, the aviator need only turn the knob 160 in the direction indicated by the lamp that is lit until the lamp is extinguished, upon which he will know that the indication of pointer 144 is approximately in correspondence with the magnetic heading as sensed by the flux valve compass means.

Fig. 4 shows a modification in which the tubes 172 and 173 are replaced by thyratrons 176 and 177 energized from source 5 through transformer 178. In addition, in this form of the invention the neon lamps are replaced by electromagnet windings 80, 81 which are shown as placed in series with the respective precessing coils 33, 32.

Figure 6:
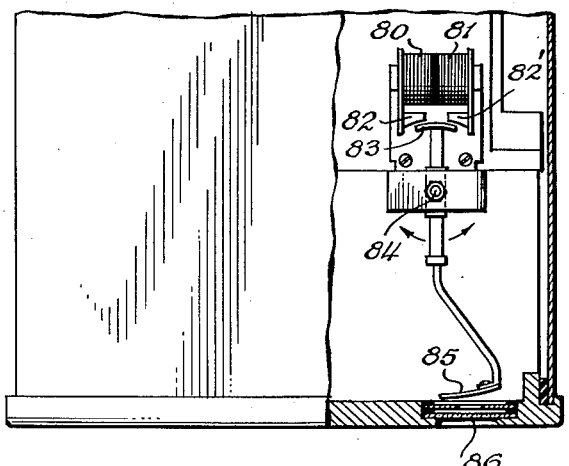
Fig. 6 is a detailed plan view, partly in section, of the improved form of indicator shown in Fig. 5.
Figure 7:
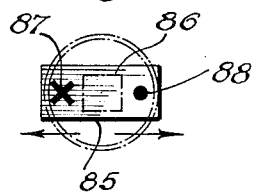
Fig. 7 is an enlarged face view of the indicator shown in Fig. 5.

Turning now to Figs. 5, 6 and 7, the two opposed windings 80 and 81 are shown as mounted on a common electromagnet having opposed pole pieces 82 and 82', the assembly being mounted near the top of the gyro housing 30. In front of said electromagnet is an armature 83 pivoted at 84 and normally spring-centralized. Said armature carries at its forward end a shutter indicator 85 lying behind a small window 86 in front of the gyro casing, said shutter acting as a different form of left-right indicator. The shutter 85 has three sectors, only one of which is visible at any one time through the window, the left-hand sector being shown as having a cross 87 thereon, the mid-portion is blank and the right-hand side has a dot 88 thereon. When neither coil is excited, therefore, the indicator is blank and when the coil 80 is excited a cross is shown in the window, and when the coil 81 is excited a dot is shown in the window. Similarly, the setting knob 160 has a cross 87' on the left-hand side and a dot 88' on the right-hand side, each below directional arrows 89. Therefore the aviator, in presetting the gyroscope, needs only turn the knob 160 in the direction indicated by the indicator 86 in combination with the matching indicators on the knob until the indications in window 86 show blank.

As explained hereinbefore, my invention is not only useful in starting up the gyroscope, but in actual flying operations, since the warning indicator gives the pilot confidence in his magnetic compass reading because he knows that if the gyroscope has temporarily wandered, the indicator 86, or in the alternative forms, one of the neon lamps, will show a persistent indication and also show in which direction the gyroscope is off. He may then either bring the gyroscope by hand to approximately its correct position, as indicated by the extinguishment of the lamp or the blank indication at 86, or he may await settling of the gyro before resetting his magnetic course. Short period indications may be disregarded, such as due to temporary deviation of the magnetic compass. As a means for reducing such short period indications, the signal circuits may be designed not to respond unless the disagreement between the magnetic compass and gyroscope exceeds several degrees.

It will of course be understood that the card on the gyroscope may be relied upon as a course-maintaining device even if the indicators show temporary disagreement with the magnetic meridian.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro-magnetic compass system, a slave directional gyroscope having a vertical face and including a vertical ring freely mounted about a normally vertical axis, a compass indicator having an element rotatable in a vertical plane at the face of said gyroscope, a horizontal shaft on which said element is mounted, gearing connecting said shaft and said vertical ring including a slip friction connection to rotate said shaft in synchronism with said ring, but permitting resetting of said shaft without disturbing the gyroscope, torque means for slaving the gyroscope, a signal generator of the selsyn type having a rotor connected to said shaft supplying signals to said torque means for slaving said gyroscope, and a setting knob on the face of said gyroscope having means adapted to be brought into engagement with said shaft for resetting the rotatable element of said compass indicator and the rotor of said signal generator.

2. In a gyro-magnetic compass system, a magnetic compass, a slave directional gyroscope having a vertical face and including a vertical ring freely mounted for turning about a normally vertical axis, a compass indicator having an element rotatable in a vertical plane at the face of said gyroscope, a horizontal shaft on which said element is mounted, means connecting said shaft and said vertical ring to rotate said shaft in synchronism with said ring, including a slip friction connection permitting resetting of said shaft without disturbing the gyroscope, torque means for slaving the gyroscope from said magnetic compass, a signal generator of the selsyn type having a rotor connected to said shaft supplying signals to said torque means for slaving said gyroscope, a signal transmitter having a rotor connected to said shaft transmitting the compass data to a distance, and a setting knob on the face of said gyroscope having means adapted to be brought into operative engagement with said shaft for manually synchronizing the magnetic compass with the rotatable element of said compass indicator, the rotor of said signal generator and the rotor of said signal transmitter without disturbing the gyroscope.

3. In a gyro-magnetic compass system, a magnetic compass, a slave directional gyroscope having a vertical face and including a vertical ring freely mounted for turning about a normally vertical axis, a compass indicator having an element rotatable in a vertical plane at the face of said gyroscope, a horizontal shaft on which said element is mounted, means connecting said shaft and said vertical ring to rotate said shaft in synchronism with said ring, including a slip friction connection permitting resetting of said shaft without disturbing the gyroscope, torque means for slaving the gyroscope from said magnetic compass, a signal generator of the selsyn type having a rotor connected to said shaft supplying signals to said torque means for slaving said gyroscope, indicating means rendered operative upon departure from synchronism between said compass indicator and magnetic compass, and a setting knob on the face of said gyroscope having means adapted to be brought into operative engagement with said shaft for manually synchronizing the magnetic compass with the rotatable element of said compass indicator and the rotor of said signal generator without disturbing the gyroscope.

4. In a gyro-magnetic compass system, a slave directional gyroscope with a vertical ring, a compass indicator having a movable element mounted on a shaft, means for operating said shaft from said ring including a connection that permits resetting of the shaft without disturbing the gyroscope, torque means for precessing the ring, slaving means including a signal transmitter having a rotor fixed to said shaft operable to supply control signals to said torque means, a left-right indicator actuated by the control signals for said torque means showing the direction of precession of the ring, and a manually settable knob having left-right indications therewith corresponding to said left-right indicator engageable with said shaft for simultaneously resetting the rotor of said signal transmitter and the movable element of said compass indicator relative to the ring.

5. In a gyro-magnetic compass system, a slave directional gyroscope including a housing and a vertical ring, an element rotatably mounted in said housing mechanically coupled to said ring by a slip friction connection, torque means for precessing said ring, slaving means including a signal transmitter having a stator fixed to the housing and a rotor fixed to said element operable to supply control signals to said torque means, and a settable knob engageable with said element to adjust the position of the rotor of said transmitter relative to said ring.

6. In a gyro-magnetic compass system, a slave directional gyroscope including a housing and a vertical ring, an element rotatably mounted in said housing mechanically coupled to said ring by a slip friction connection, a compass indicator having a movable part positioned by said element, torque means for precessing said ring, slaving means including a signal transmitter having a stator fixed to the housing and a rotor fixed to said element operable to supply control signals to said torque means, and a knob engageable with said element for adjusting the setting of the rotor of said transmitter and the movable part of said compass indicator relative to said ring.

CAESAR F. FRAGOLA.

REFERENCES CITED

The following references are of record in the file of this patent:

UNITED STATES PATENTS

| Number | Name | Date |
|---|---|---|
| 1,982,702 | Sperry | Dec. 4, 1934 |
| 2,086,898 | Carter | July 13, 1937 |
| 2,126,935 | Von Manteuffel | Aug. 16, 1938 |
| 2,220,055 | Fischel et al. | Oct. 29, 1940 |
| 2,249,373 | Alkan | July 15, 1941 |
| 2,252,338 | Alkan | Aug. 12, 1941 |
| 2,357,319 | Esval et al. | Sept. 5, 1944 |
| 2,363,500 | Carter et al. | Nov. 28, 1944 |
| 2,383,461 | Esval et al. | Aug. 28, 1945 |
| 2,403,091 | Lear | July 2, 1946 |
| 2,406,341 | Beach et al. | Aug. 27, 1946 |
| 2,414,448 | Carter | Jan. 21, 1947 |

FOREIGN PATENTS

| Number | Country | Date |
|---|---|---|
| 482,389 | Great Britain | Mar. 29, 1938 |